United States Patent
Masuda et al.

(10) Patent No.: US 12,131,640 B2
(45) Date of Patent: Oct. 29, 2024

(54) BOARDING AND ALIGHTING TIME INFORMING METHOD

(71) Applicant: TOYOTA JIDOSHA KABUSHIKI KAISHA, Toyota (JP)

(72) Inventors: Taizo Masuda, Yokohama (JP); Ryota Tomizawa, Mishima (JP); Sei Miyazaki, Susono (JP); Yuki Nishikawa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 87 days.

(21) Appl. No.: 17/978,385

(22) Filed: Nov. 1, 2022

(65) Prior Publication Data

US 2023/0230482 A1    Jul. 20, 2023

(30) Foreign Application Priority Data

Jan. 17, 2022    (JP) ................................. 2022-004909

(51) Int. Cl.
  *G08G 1/133*    (2006.01)
  *G08G 1/005*    (2006.01)
(52) U.S. Cl.
  CPC ............. *G08G 1/133* (2013.01); *G08G 1/005* (2013.01)
(58) Field of Classification Search
  CPC ................................ G08G 1/133; G08G 1/005
  See application file for complete search history.

(56) References Cited

U.S. PATENT DOCUMENTS

| | | | | |
|---|---|---|---|---|
| 6,006,159 A | * | 12/1999 | Schmier | G08G 1/123 340/988 |
| 6,919,804 B1 | * | 7/2005 | Cook | G07C 9/00 340/556 |
| 9,294,878 B2 | * | 3/2016 | Tian | H04W 4/029 |
| 10,482,691 B1 | * | 11/2019 | McCluskey | G06F 9/451 |
| 11,145,145 B2 | * | 10/2021 | Anabuki | G08G 1/123 |
| 11,450,153 B2 | * | 9/2022 | Anabuki | G05D 1/0038 |
| 11,727,802 B2 | * | 8/2023 | Okazaki | G07C 5/0808 701/117 |
| 2009/0160678 A1 | * | 6/2009 | Turnbull | B60Q 1/535 340/944 |
| 2012/0105256 A1 | * | 5/2012 | Hsieh | G08G 1/133 340/994 |

(Continued)

FOREIGN PATENT DOCUMENTS

| | | |
|---|---|---|
| JP | 2019-197268 A | 11/2019 |
| JP | 2020-095354 A | 6/2020 |
| JP | 2021-004824 A | 1/2021 |

*Primary Examiner* — Hoi C Lau
(74) *Attorney, Agent, or Firm* — Dinsmore & Shohl LLP

(57) ABSTRACT

A boarding and alighting time informing method includes a determination step for determining, at a stop where a bus stops, whether a person with disabilities is going to board the bus and whether a person with disabilities is going to alight from the bus, a prediction step for predicting a boarding and alighting time at the stop in either one or both of a case when it is determined that a person with disabilities is going to board the bus and a case when it is determined that a person with disabilities is going to alight from the bus, and an informing step for informing at least one of the inside and the outside of the bus about the predicted boarding and alighting time.

10 Claims, 2 Drawing Sheets

(56) References Cited

U.S. PATENT DOCUMENTS

| | | | |
|---|---|---|---|
| 2014/0125502 A1* | 5/2014 | Wittkop | G08G 1/127 340/6.1 |
| 2015/0177011 A1* | 6/2015 | Ibrahimi | G01C 21/343 701/465 |
| 2015/0286936 A1* | 10/2015 | Furuya | G06Q 50/40 706/58 |
| 2015/0348068 A1* | 12/2015 | Fei | G06Q 10/06393 705/7.31 |
| 2017/0072974 A1* | 3/2017 | Morita | B61L 27/04 |
| 2019/0039634 A1* | 2/2019 | Tokumaru | B61L 27/40 |
| 2020/0027284 A1* | 1/2020 | Anabuki | G08G 1/123 |
| 2020/0160631 A1* | 5/2020 | Ong | B61L 27/40 |
| 2020/0160708 A1* | 5/2020 | Kamiya | G06V 20/53 |
| 2020/0182638 A1* | 6/2020 | Suzuki | G06V 40/172 |
| 2020/0272965 A1* | 8/2020 | Tanabe | G06Q 10/06311 |
| 2021/0407223 A1* | 12/2021 | Anabuki | G05D 1/0038 |
| 2023/0116572 A1* | 4/2023 | Bang | G05D 1/0038 701/2 |
| 2023/0230482 A1* | 7/2023 | Masuda | G06Q 10/02 |

* cited by examiner

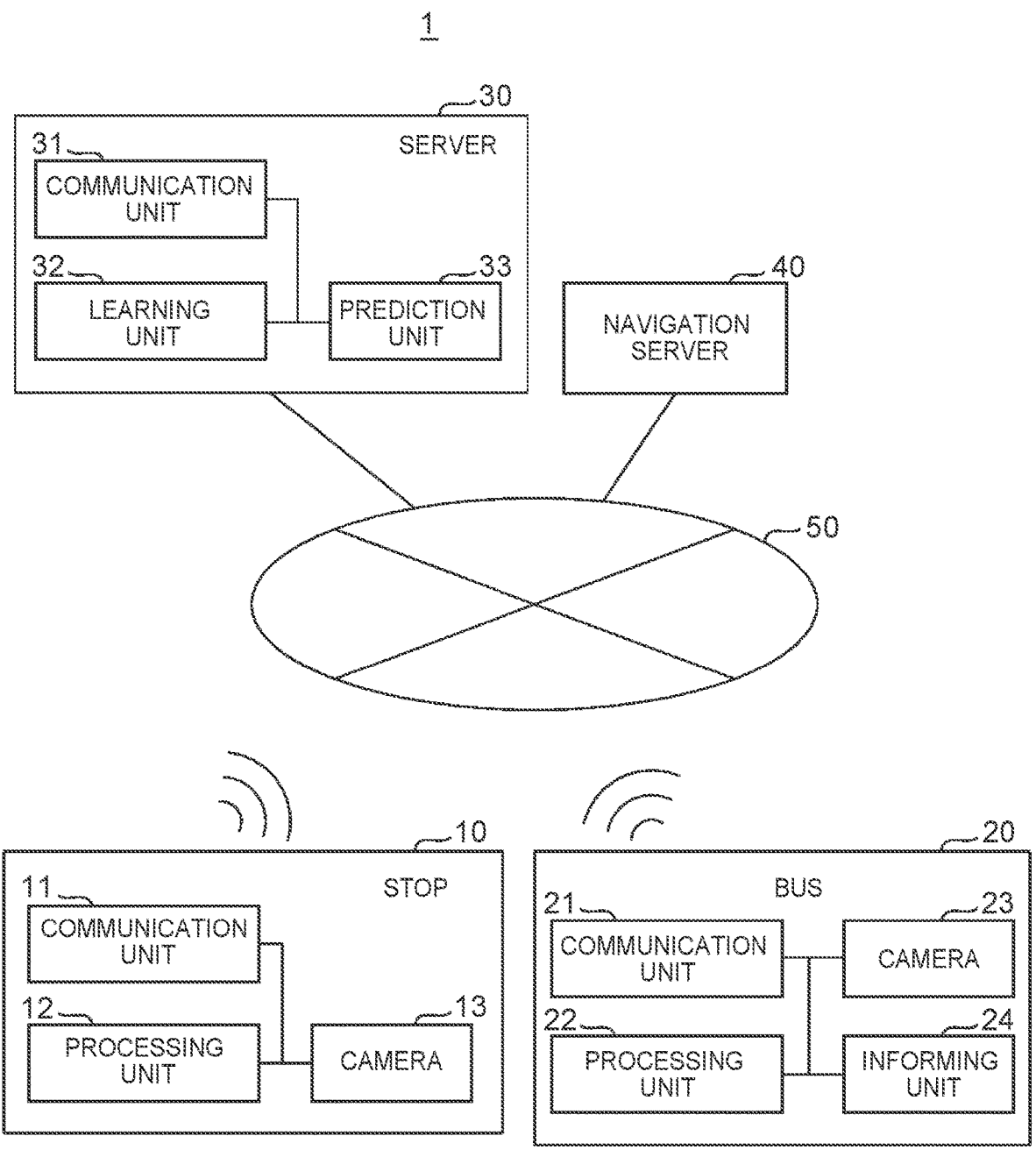

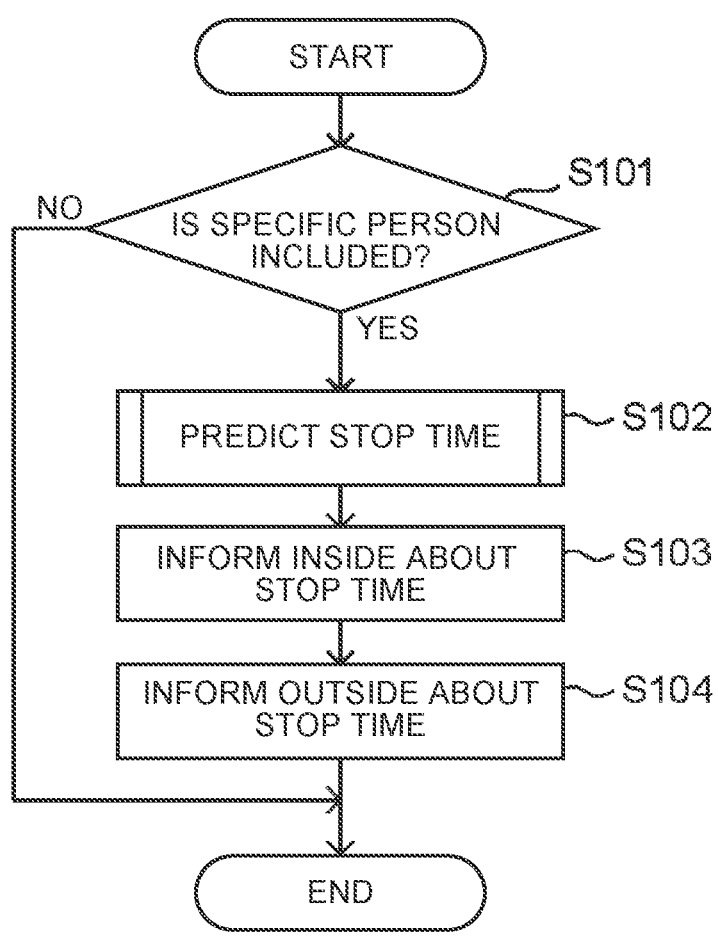

BOARDING AND ALIGHTING TIME INFORMING METHOD

CROSS-REFERENCE TO RELATED APPLICATION

This application claims priority to Japanese Patent Application No. 2022-004909 filed on Jan. 17, 2022, incorporated herein by reference in its entirety.

BACKGROUND

1. Technical Field

The present disclosure relates to the technical field of a boarding and alighting time informing method that informs about the time required for boarding and alighting at a bus stop of a public transportation bus.

2. Description of Related Art

As a method in this field, a technique is proposed that predicts the stop time at a stop of a route bus based, for example, on at least one of the number of passengers in the route bus and the number of passengers who are going to board the route bus (See Japanese Unexamined Patent Application Publication No. 2021-004824 (JP 2021-004824 A)).

SUMMARY

For example, a person with disabilities or an elderly person needs a relatively long time to board and alight a bus. The predicted stop time of a bus, if informed, makes the user feel convenient since the user can know an approximate stop time of the bus. On the other hand, if the predicted stop time is informed every time the bus stops at a bus stop, the user may feel annoyed.

In view of the foregoing, it is an object of the present disclosure to provide a boarding and alighting time informing method that can appropriately inform about the stop time of a bus (in other words, the time required for boarding and alighting the bus).

One aspect of the present disclosure relates to a boarding and alighting time informing method including a determination step, a prediction step, and an informing step. The determination step determines, at a stop where a bus stops, whether a person with disabilities is going to board the bus and whether a person with disabilities is going to alight from the bus. The prediction step predicts a boarding and alighting time at the stop in either one or both of a case when it is determined that a person with disabilities is going to board the bus and a case when it is determined that a person with disabilities is going to alight from the bus. The informing step informs at least one of the inside and the outside of the bus about the predicted boarding and alighting time.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a block diagram showing a configuration of an informing system according to an embodiment; and FIG. 2 is a flowchart showing an operation of the informing system according to the embodiment.

DETAILED DESCRIPTION OF EMBODIMENTS

An embodiment of a boarding and alighting time informing method will be described with reference to FIG. 1 and FIG. 2. In FIG. 1, an informing system 1 to which the boarding and alighting time informing method is applied includes a stop 10, a bus 20, and a server 30. The stop 10, bus 20, and server 30 can communicate with each other via a wide area network 50 such as the Internet.

The stop 10 includes a communication unit 11, a processing unit 12, and a camera 13. The camera 13 may be provided, for example, on the guide display board, or on the shed (that is, the roof structure), of the stop 10. The camera 13 captures the surroundings of the stop 10 (especially people waiting for a bus at the stop 10). The processing unit 12 performs predetermined image processing on an image, captured by the camera 13, for recognizing the number of persons waiting for a bus at the stop 10, whether the waiting people include a specific person, etc. The processing unit 12 sends the information indicating the image processing result to the server 30 via the communication unit 11.

A "specific person" means a person who takes a relatively long time to board a bus or alight from a bus, such as a person with disabilities, an elderly person, and a person with a child. For example, the processing unit 12 may determine a person having a white cane or a crutch and a person in a wheelchair as a person with disabilities. For example, the processing unit 12 may determine a person having a cane or a walker as an elderly person. For example, the processing unit 12 may determine a person holding a child, a person holding a hand with a child, or a person having a stroller as a person with a child.

The bus 20 includes a communication unit 21, a processing unit 22, a camera 23, and an informing unit 24. The camera 23 is arranged so that the inside of the bus 20 can be captured. The processing unit 22 performs predetermined image processing on an image, captured by the camera 23, for recognizing the number of persons on the bus 20, whether the people include a specific person, etc. The processing unit 22 sends the information indicating the result of image processing to the server 30 via the communication unit 21.

When it is possible for the user to book a ride on the bus 20, the user may enter the information indicating that the user is a person with disabilities, for example, when booking a ride on the bus 20 using user's own terminal device. In addition, when booking a ride on the bus 20, the user may enter the boarding stop and the alighting stop. The information relating to this booking information may be sent to the server 30.

The server 30 includes a communication unit 31, a learning unit 32, and a prediction unit 33. The learning unit 32 builds a learning model that predicts the time required for boarding and alighting at a bus stop by performing the predetermined learning processing using training data. This training data includes, for example, the characteristics of a specific person, the characteristics of a stop such as the stop 10, the characteristics of a bus such as the bus 20, the number of boarding and alighting passengers, the time required for boarding and alighting, the time zone, and the season.

The characteristics of a specific person include, for example, the walking speed and the time required for ascending and descending steps. The characteristics of a bus stop include, for example, the height of the sidewalk where the bus stop is provided and the distance from the end of the sidewalk to the bus. The characteristics of a bus include, for example, the width of the entrance door and the height from the ground to the entrance door.

The prediction unit 33 determines whether a specific person is included in at least one of the passengers boarding the bus 20 and the passengers alighting the bus 20 at the stop 10, based on the information indicating the result of the image processing sent from the stop 10 and the information indicating the result of the image processing sent from the bus 20. Note that, when a booking for a ride on the bus 20 is possible as described above, the prediction unit 33 may use the information on the booking for a ride when making the determination described above.

When it is determined that, at the stop 10, at least one of the people going to board the bus 20 and the people going to alight from the bus 20 include a specific person, the prediction unit 33 predicts the stop time of the bus 20 at the stop 10 based on the information indicating the result of the image processing sent from the stop 10, on the information indicating the result of the image processing sent from the bus 20, and on the learning model described above. Note that, when it is possible to book a ride on the bus 20 as described above, the prediction unit 33 may use the information on the booking for a ride (particularly, the information indicating the boarding stop and the alighting stop) to predict the stop time.

The prediction unit 33 sends the information indicating the predicted stop time to the bus 20 via the communication unit 31. Upon receiving the information indicating the stop time, the processing unit 22 of the bus 20 controls the informing unit 24 so that the inside and outside the vehicle of the bus 20 are informed about the stop time. The informing unit 24 may include a speaker. The speaker operating as the informing unit 24 may output, inside and outside the bus 20, voice corresponding, for example, to the stop time. The informing unit 24 may include a display device viewable by the occupants inside the bus 20 and a display device viewable from the outside of the bus 20. These display devices operating as the informing unit 24 may display characters indicating, for example, the stop time.

The prediction unit 33 of the server 30 may further associate the information indicating the predicted stop time, for example, with the position of the bus 20 and send the associated information to a navigation server 40 via the communication unit 31. The navigation server 40 is a server configured to be able to communicate with the navigation device mounted on a vehicle. The navigation server 40 may send the information indicating the stop time of the bus 20 to the navigation device mounted on a vehicle around the bus 20. Upon receiving this information, the navigation device mounted on a vehicle around the bus 20 (for example, the vehicle following the bus 20) may display the stop time of the bus 20 on the screen.

Various existing embodiments can be applied to the image processing in the processing units 12 and 22, to the learning processing in the learning unit 32, to the communication between the server 30 and the navigation server 40, and to the method used by the navigation server 40 for identifying the vehicle around the bus 20. Therefore, the description of their details will be omitted.

Next, the operation of the informing system 1 will be described with reference to the flowchart shown in FIG. 2. In FIG. 2, the prediction unit 33 of the server 30 determines whether a specific person is included in the people in at least one of the bus 20 and the stop where the bus 20 stops next (for example, the stop 10) (Step S101).

When it is determined in the processing in step S101 that no specific person is included (step S101: No), the operation shown in FIG. 2 is terminated. Then, after a predetermined time elapses, the processing of step S101 may be performed. That is, the operation shown in FIG. 2 may be repeated at a cycle corresponding to a predetermined time.

On the other hand, when it is determined in the processing in step S101 that a specific person is included (step S101: Yes), the prediction unit 33 predicts the stop time of the bus 20 at the stop where the bus 20 stops next (for example, the stop 10) (step S102).

The prediction unit 33 sends the information indicating the predicted stop time to the bus 20 via the communication unit 31. Upon receiving the information indicating the stop time, the processing unit 22 of the bus 20 controls the informing unit 24 so that the inside and outside of the bus 20 are informed about the stop time (steps S103 and S104). At this time, the prediction unit 33 may send the information indicating the predicted stop time to the navigation server 40 via the communication unit 31.

Technical Effect

The informing system 1 predicts the stop time of the bus 20 and informs about the predicted stop time when a specific person is included in at least one of the people going to board the bus 20 and the people going to alight from the bus 20. On the other hand, the informing system 1 does not predict the stop time of the bus 20 when a specific person is included in neither the people going to board the bus 20 nor the people going to alight from the bus 20. This configuration can reduce the user's annoyance caused by being informed about the stop time, compared to the case where the users are informed about the stop time every time the bus 20 stops. This configuration can also reduce the processing load of the server 30. This means that the informing system 1 can inform about the stop time of the bus 20 (in other words, time required for boarding and alighting) appropriately.

In the informing system 1, the learning unit 32 of the server 30 performs predetermined learning processing using training data including the characteristics of a specific person, such as a person with disabilities, and builds a learning model. Then, using the learning model, the prediction unit 33 predicts the stop time of the bus 20. This configuration allows the stop time to be predicted more appropriately as compared with the case where the stop time is predicted only from the number of boarding and alighting passengers.

When informing about the stop time, the processing unit 22 of the bus 20 may be configured to control the informing unit 24 so that the inside and outside of the bus 20 are informed that a person with disabilities is to board or alight from the bus 20. This configuration allows the passengers of the bus 20 and the people around the bus 20 to know the reason why the stop time is informed and the reason why the stop time is relatively long.

Various aspects of the disclosure derived from the embodiment described above will be described below.

The boarding and alighting time informing method in one aspect of the present disclosure is a boarding and alighting time informing method including a determination step for determining, at a stop where a bus stops, whether a person with disabilities is going to board the bus and whether a person with disabilities is going to alight from the bus, a prediction step for predicting a boarding and alighting time at the stop in either one or both of a case when it is determined that a person with disabilities is going to board the bus and a case when it is determined that a person with disabilities is going to alight from the bus, and an informing step for informing at least one of the inside and the outside of the bus about the predicted boarding and alighting time.

In the boarding and alighting time informing method, the boarding and alighting time may be predicted using a trained model trained using training data. The training data includes at least one of the characteristics of a person with disabilities, the characteristics of the stop, and the characteristics of the bus.

In the boarding and alighting time informing method, the boarding and alighting time may not be predicted in a case when it is determined that a person with disabilities is not going to board the bus and that a person with disabilities is not going to alight from the bus.

In the present disclosure, the bus may be an autonomous driving bus. It is to be understood that the present disclosure is not limited to the embodiments described above but may be changed as appropriate within the scope of claims and within the spirit and the concept of the present disclosure understood from this specification and that a boarding and alighting time informing method to which such changes are added is also included in the technical scope of the present disclosure.

What is claimed is:

1. A boarding and alighting time informing method comprising:
   receiving first characteristics associated with a first person;
   receiving second characteristics associated with a bus stop;
   receiving third characteristics associated with a bus;
   receiving a first image of an interior of the bus;
   receiving a second image of the bus stop;
   determining, at the bus stop where the bus stops, whether the first person is going to board the bus and whether the first person is going to alight from the bus based on the first image and the second image;
   upon determination that the first person is going to board the bus or alight from the bus, predicting a boarding and alighting time at the bus stop based on the first characteristics, the second characteristics, and the third characteristics; and
   outputting information indicating the predicted boarding and alighting time to inform at least one of an inside of the bus and an outside of the bus.

2. The boarding and alighting time informing method according to claim 1, wherein the boarding and alighting time is predicted using a trained model trained using training data, the training data including the first characteristics, the second characteristics, and the third characteristics.

3. The boarding and alighting time informing method according to claim 1, wherein the boarding and alighting time is not predicted in a case when it is determined that the first person is not going to board the bus and that the first person is not going to alight from the bus.

4. The boarding and alighting time informing method according to claim 1, wherein the information indicating the predicted boarding and alighting time is output by a speaker on the bus.

5. The boarding and alighting time informing method according to claim 1, wherein the information indicating the predicted boarding and alighting time is output by a display device viewable from at least one of the inside of the bus and an outside of the bus.

6. The boarding and alighting time informing method according to claim 1, wherein the first characteristics comprise a walking speed of the first person and a time required for the first person to ascend or descend steps of the bus.

7. The boarding and alighting time informing method according to claim 1, wherein the second characteristics comprise a height of a sidewalk where the bus stop is provided and a distance from the sidewalk to the bus.

8. The boarding and alighting time informing method according to claim 1, wherein the third characteristics comprise a width and a height of an entrance door.

9. The boarding and alighting time informing method according to claim 6, wherein the second characteristics comprise a height of a sidewalk where the bus stop is provided and a distance from the sidewalk to the bus.

10. The boarding and alighting time informing method according to claim 9, wherein the third characteristics comprise a width and a height of an entrance door.

* * * * *